April 10, 1962  R. P. SKERRITT  3,029,028
ROTARY LAWN SPRINKLER
Filed Aug. 12, 1959  2 Sheets-Sheet 1
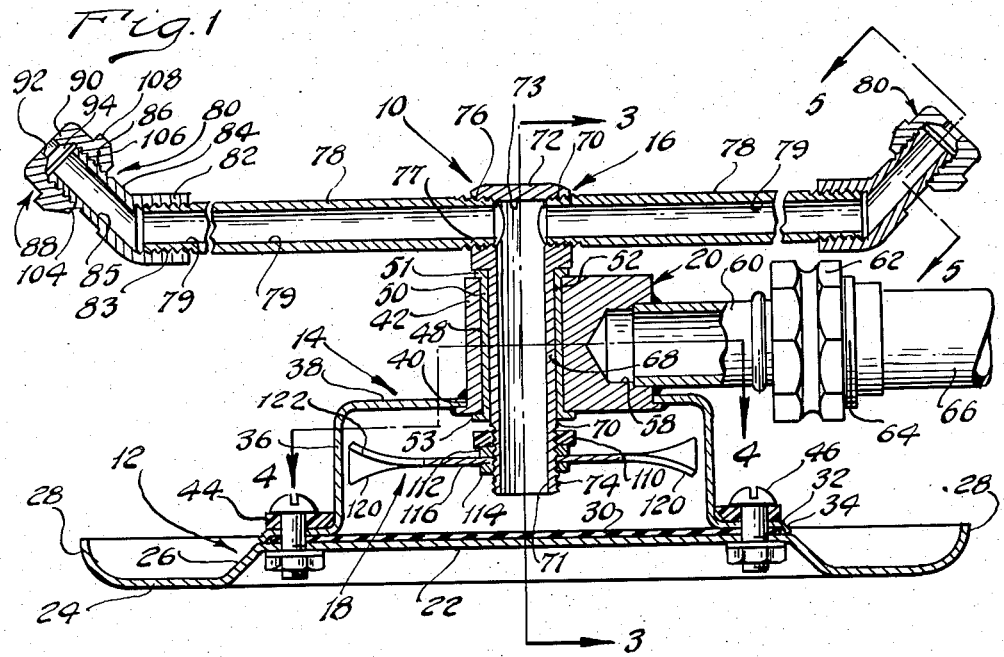
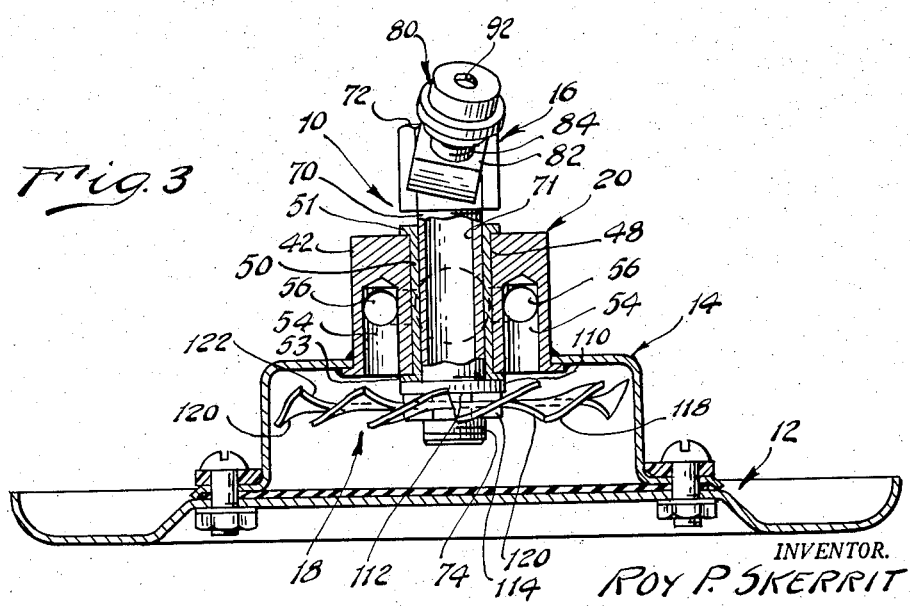
INVENTOR.
ROY P. SKERRITT
BY Barthel + Bagbee
ATTORNEYS April 10, 1962   R. P. SKERRITT   3,029,028
ROTARY LAWN SPRINKLER
Filed Aug. 12, 1959   2 Sheets-Sheet 2
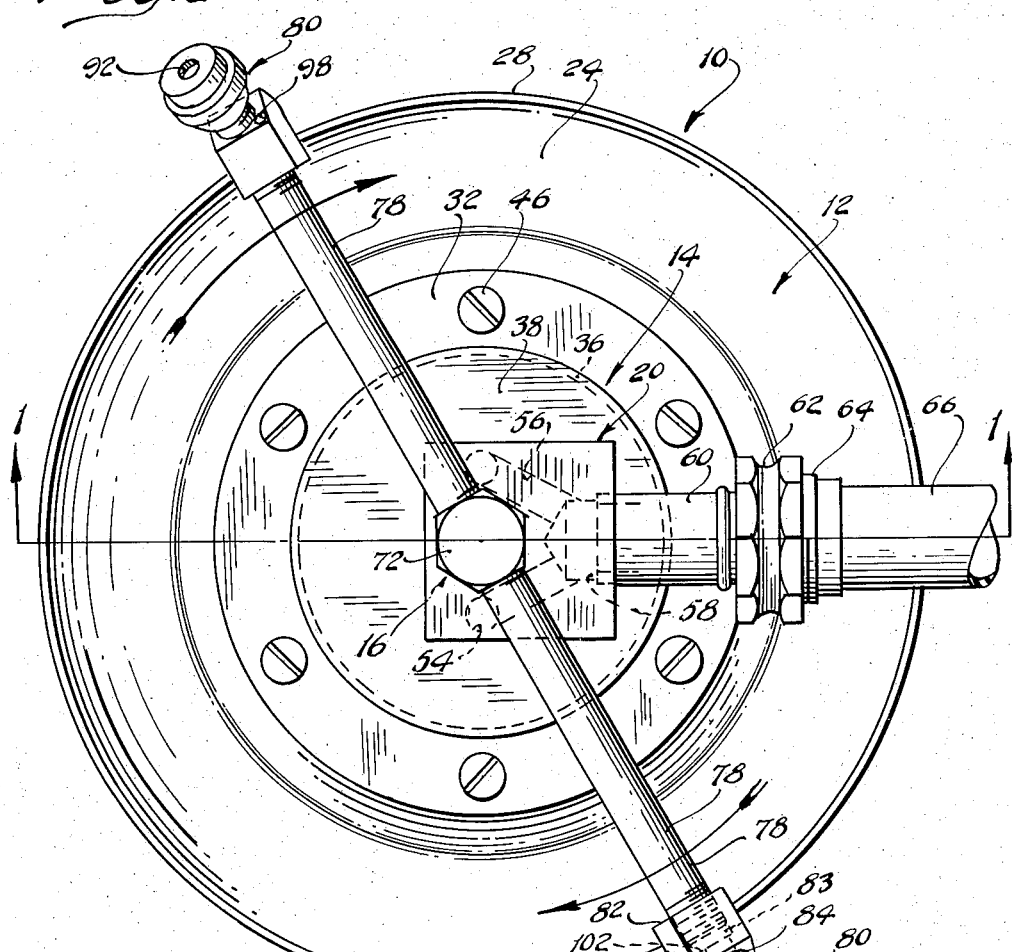
Fig. 2
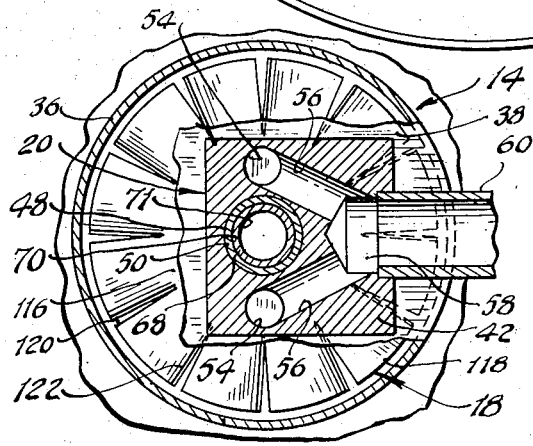
Fig. 4
Fig. 5
INVENTOR.
ROY P. SKERRITT
BY
Barthel & Bugbee
ATTORNEYS

United States Patent Office 3,029,028
Patented Apr. 10, 1962

3,029,028
ROTARY LAWN SPRINKLER
Roy P. Skerritt, 18411 Inkster Road, Livonia, Mich.
Filed Aug. 12, 1959, Ser. No. 833,298
8 Claims. (Cl. 239—252)

This invention relates to lawn sprinklers and, in particular, to rotary lawn sprinklers.

Hitherto, the ordinary rotary lawn sprinkler has been provided with a rotor including a rotary sprinkler head with hollow arms carrying inclined nozzles at their outer ends, these nozzles not only producing the water spray but also imparting rotation to the hollow sprinkler head through which water reaches the arms and thence the nozzle. In a rotary lawn sprinkler, the ideal sought is to propel the water outward to the greatest practical distance so as to distribute water over a large area at the fastest rate of application which the soil could absorb without runoff or puddle formation, yet with even distribution over that area. These conditions, in prior rotary lawn sprinklers, were found to conflict with one another, for reasons stated below, with the result that only a compromise could be reached between them. In the first place, the prior rotary lawn sprinkler had a water inlet passageway which entered the sprinkler housing below the tubular rotary sprinkler head shaft, which carried a flange effecting a water seal between the shaft and the bottom of the shaft bearing in which it rotates. The hydraulic pressure of the water against this flange, however, forced the shaft flange upward against the bottom of the bearing, causing a frictional braking action between them which increased the amount of power necessary to rotate the rotor.

To throw water a great distance, however, it is necessary to have a greater area of inlet than outlet for the water, and this condition increases the hydraulic braking action just mentioned. To counteract this hydraulic braking action it is necessary to decrease the size of the inlet relatively to the outlet or increase the size of the outlet relatively to the inlet or else the adjustment of inclination of the sprinkler head nozzles has to be so close to the horizontal as to drive the sprinkler head at an excessive speed, and the higher water pressure which delivers a greater volume of water increases the speed of rotation. Paradoxically, however, the higher the speed of rotation, the shorter is the distance to which the water will be projected by the nozzles because, in effect, the outlets of the nozzles are running away from the direction of the force required to propel water to a great distance. As a result, the attempted delivery of water at a higher rate of delivery causes the area sprinkled to be decreased, especially when the delivery starts with the water at a moderate pressure and continues with an increase of water pressure to a comparatively high pressure. Moreover, at high speeds of rotation of the sprinkler head, the evenness of distribution of the water is unfavorably affected because at a high speed of rotation the greater proportion of the volume of water delivered tends to fall nearer the sprinkler, and over a smaller area of water delivery, the application rate of water is also unfavorably affected.

The present invention provides a rotary lawn sprinkler which reconciles the conflicting conditions set forth above for the ideal rotary lawn sprinkler by causing the water under pressure to enter the sprinkler housing at a location above the lower end of the tubular sprinkler head shaft, preferably through at least two inlet ducts disposed on opposite sides of the shaft bearing and in close proximity thereto. The lower end of the sprinkler head shaft within the housing water chamber carries a gasket and a generally plate-shaped or disc-shaped retardation rotor mounted perpendicular to the axis of the shaft and preferably perpendicular to the axes of the inner portions of the water inlet ducts. The periphery of this rotor carries inclined retardation vanes as described below. The gasket above the rotor engages the lower end of the sprinkler head shaft bearing so as to prevent escape of water except through the tubular shaft. The downward force of the water under pressure emerging from the inner ends of the inlet ducts tends to push the retardation rotor downward so as to counteract the upward pressure exerted against the lower end of the sprinkler head shaft by its hydraulic piston action, thus also counteracting the braking effect introduced in prior rotary lawn sprinklers as explained above by reducing the braking friction and consequently reducing the amount of rotational torque required to be produced by the inclined sprinkler nozzles on the sprinkler head.

Furthermore, the rotary lawn sprinkler of the present invention, by providing the inclined retardation vanes at the periphery of the retardation rotor on the tubular sprinkler head shaft causes the water under pressure emerging from the lower ends of the inlet ducts to apply a counter-rotating torque to the sprinkler head shaft, thereby reducing the rotational speed which the sprinkler head would otherwise possess, with the result that the sprinkler head can be given a relatively larger area of inlet than of outlet for throwing water a great distance. At the same time, the speed of rotation is kept down by the retardation rotor so that as the pressure of the water supply increases, the vaned retardation rotor continues to reduce the speed of the sprinkler head so that its speed may be held below 60 or 70 revolutions per minute. Without the retardation rotor of the rotary lawn sprinkler of the present invention, the speed of the rotary sprinkler head would increase with increase of the water pressure to several hundred revolutions per minute, producing the decreased range and other difficulties described above in connection with prior rotary lawn sprinklers. Thus, the rotary lawn sprinkler of the present invention is enabled to throw water at a great distance under relatively high pressures yet do so at a relatively low and retarded speed or rotation which at the same time gives much more even distribution of the water over the wider area covered so as to deposit the water on the soil at a controlled rate which the soil can absorb without causing the water to run off or form puddles. In this manner, the present invention reconciles the conflicting conditions which the prior rotary lawn sprinklers were unable to do. The present lawn sprinkler also provides an improved sprinkler nozzle, as set forth below.

Accordingly, one object of the present invention is to provide a rotary lawn sprinkler having a rotary sprinkler head equipped with positive shaft-depressing means which counteracts the frictional braking effect previously caused by the sealing gasket on the upwardly-urged shaft acting as a hydraulic plunger against the lower end of the shaft bearing.

Another object is to provide a rotary lawn sprinkler of the foregoing character wherein the sprinkler head shaft is also provided with positive shaft retardation means which applies a counter-rotating torque to the torque imparted to the shaft by the inclined nozzles on the sprinkler head, thereby reducing the speed otherwise imparted to the shaft and sprinkler head.

Another object is to provide a rotary lawn sprinkler of the foregoing character which also provides an improved nozzle construction for the sprinkler head which enables the throwing of a greater volume of water at higher pressure to greater distances while at the same time breaking up a portion of the stream into a spray which adequately waters the inner area adjacent the sprinkler otherwise overshot by prior distance-getting nozzles.

Another object is to provide a rotary lawn sprinkler of the foregoing character which, because of the novel features of construction set forth in the above objects, causes the water to be propelled outward to the greatest practical distance yet with a relatively even distribution over a large area surrounding the sprinkler, and at the fastest rate of application which the soil is capable of absorbing substantially without runoff of water or puddle formation.

Other objects and advantages of the invention will become apparent during the course of the following description of the accompanying drawings, wherein:

FIGURE 1 is a central vertical section through an improved rotary lawn sprinkler, according to one form of the invention, taken along the line 1—1 in FIGURE 2, with the water shut off and the sprinkler head in its lowered position of rest;

FIGURE 2 is a top plan view of the rotary lawn sprinkler shown in FIGURE 1;

FIGURE 3 is a central vertical section through the rotary lawn sprinkler of FIGURES 1 and 2 in a plane perpendicular to the section plane of FIGURE 1, namely along the line 3—3 in FIGURE 1, with the water turned on and the sprinkler head in its raised operating position;

FIGURE 4 is a fragmentary horizontal section taken along the line 4—4 in FIGURE 1, showing the anti-friction retardation rotor and water inlet ducts; and FIGURE 5 is a cross-section, partly in top plan view, of one of the nozzles taken along the line 5—5 in FIGURE 1.

Referring to the drawings in detail, FIGURES 1 to 3 inclusive show a rotary lawn sprinkler, generally designated 10, according to one form of the invention as consisting generally of a base 12 supporting a housing 14 in which is mounted a sprinkler head 16 equipped with an anti-friction retardation rotor 18 mounted on its lower end within the housing 14 and supplied with water under pressure through a water supply manifold 20. The base 12 may be of any suitable shape, the form shown being saucer-shaped with a circular central portion or platform 22 raised above the annular peripheral bottom wall 24 by a frusto-conical connecting wall 26, the peripheral wall 24 having an upturned rim 28.

Mounted on the platform 22 (FIGURES 1 and 3) is a sealing disc or gasket 30 of elastic deformable material, such as natural or synthetic plastic of the elastomer family. Superimposed upon the sealing disc 30 is the peripheral attachment flange 32 and inclined gasket-retaining edge flange 34 integral with the cylindrical side wall 36 of the cup-shaped housing 14. The top wall 38 of the housing 14 has a square hole 40 in which the flanged lower end of the rectangular block 42 forming the major part of the water supply manifold 20 is secured by brazing, soldering, welding or the like. The peripheral flange 32 of the housing 14 and the sealing disc 30, together with an external sealing ring 44 are drilled and are secured to the base platform 22 by bolts or other fasteners 46.

The block 42 of the water supply manifold 20 is provided with a bore 48 concentric with the housing 14 in which is mounted a sprinkler head shaft sleeve bearing 50 having upper and lower end flanges 51 and 53 and a central bearing bore 52. The manifold block 42 on opposite sides of the bore 48 is provided with downwardly-directed water inlet ducts 54 (FIGURE 3), the axes of which are disposed parallel to one another and also parallel to the axis of the bore 50. The inlet ducts 54 at their upper ends are connected by horizontal converging passageways 56 (FIGURE 4) to a counterbored inlet port 58. Secured to the manifold block 42 as by welding in the inlet port 58 is a hose coupling nipple 60 (FIGURES 1 and 2) upon which is rotatably mounted an internally-threaded hose coupling collar 62, preferably with a hexagonal rim for the application of a wrench. The hose coupling collar 62 receives the conventional externally-threaded coupling connection 64 mounted on the end of the ordinary flexible garden hose 66 which is coupled at its opposite end (not shown) to the usual faucet or other source of water under pressure.

Rotatably mounted in the bearing bore 52 of the sleeve bearing 50 is the main portion 68 of a tubular sprinkler head shaft 70 containing a bore or passageway 71 and terminating at its upper end in an enlargement 72 preferably of hexagonal outline (FIGURE 2) to receive a wrench, and at its lower end in a threaded end portion 74 (FIGURE 1). The enlargement 72 has an internal piston area 73. The enlargement 72 in the lowered resting or inoperative position of the sprinkler head 16 with the water shut off rests upon the upper end flange 51 of the sleeve bearing 50 and has a pair of diametrically-opposite radially-disposed internally-threaded ports 76. Mounted in the ports 76 are the correspondingly-threaded inner ends 77 of tubular arms 78 containing bores or passageways 79, the outer threaded ends 81 of the arms 78 carrying reaction water sprinkler nozzles, generally designated 80. The two water nozzles 80 and their arms 78 are of similar construction. Each consists of a lower end portion 82 containing an internally-threaded bore 83 threaded upon the threaded outer end 81 of its respective tubular arm 78 and having an upwardly-inclined tubular stem 84 containing a bore or passageway 85. The stem 84 has an externally-threaded upper end portion upon which is mounted the internally-threaded annular portion 86 of a cup-shaped nozzle cap 88. The end wall 90 of the nozzle cap 88 is provided with an outlet orifice 92 having a flared inner end 94 communicating with the outer end of the stem bore 85. As shown in FIGURES 2 and 5, the lower end portion 82 of the stem 84 is preferably of rectangular cross-section in order to receive a suitable wrench (not shown) for adjusting the angle of inclination of the stem passageway 85 relatively to the axis of the tubular arm bore 79 (FIGURE 2) so as to impart a rotational torque-producing reaction thrust to the opposite ends of the tubular arms 78 by the opposite inclination of the opposite nozzles rearwardly relatively to the intended direction of rotation of the sprinkler head 16 (FIGURE 2).

Each rectangular end portion 82 has an end surface 96 surrounding its junction with the stem 84. Emerging through the end surface 96 is the outer end 98 of an auxiliary water jet passageway 100, the axis of which is disposed slightly divergent to the axis of the stem bore 85 for a reason stated below. The inner end 102 of the auxiliary water jet passageway 100 communicates with the threaded bore 83 just forward of the end of the threaded end portion 81 of each arm 78 so as to receive water under pressure from the bore of passageway 79 of its respective tubular arm 78. The auxiliary jet passageway 100 is slightly divergent relatively to the axis of the stem bore or passageway 85 in order that the jet of water emerging from it will miss the annular end surface 104 of the nozzle cap 88 and will impinge upon the frusto-conical surface 106 thereof and be deflected thereby into a fan-shaped spray of water composed of a large number of small streams. This fan-shaped spray or curtain of water is of short range capability and is propelled only a sufficient distance to water the inner portion of the area covered by the rotary lawn sprinkler 10 of the present invention. Above the frusto-conical water-deflecting surface 106, each nozzle cap 88 is provided with a hexagonal or other suitable wrench-receiving rim 108 for facilitating rotational adjustment of the cap 88 relatively to the stem 84.

Mounted on the externally-threaded lower end portion 74 nearest the lower flange 53 of the sleeve bearing 50 (FIGURE 1) is an internally-threaded sealing washer or gasket 110 of synthetic plastic, synthetic rubber, natural rubber or other suitable sealing substance. Threaded onto the threaded portion 74 of the tubular sprinkler head shaft 70 below the sealing washer 110 are two axially-spaced nuts 112 and 114 between which is mounted the disc-like hub 116 of the retardation rotor 18. The periphery of the retardation rotor 18 is provided with inclined counter-rotation or retardation vanes or blades 118 (FIGURE 3). Assuming a clockwise rotation of the sprinkler head 16 when viewed from above, as shown in FIGURE 2, and viewing the retardation rotor 18 in top plan view (FIGURE 4), the right-hand edge 120 of each vane or blade 118 is disposed below and the left-hand edge 122 is disposed above the plane of the disc-like hub 116 in order for the water emerging under pressure from the inlet ducts 54 to produce a retardation or counter-rotating effect upon the tubular sprinkler head shaft 70 and consequently upon the sprinkler head 16.

In the adjustment of the lawn sprinkler 10 of the present invention, prior to its operation, the sprinkler nozzles 80 are tilted rearwardly in opposite directions on their respective tubular arms 78 relatively to the intended direction of rotation of the sprinkler head 16 by grasping the nozzle with a wrench and the arm with a pair of pliers, the tilted effect being shown in FIGURES 2 and 3. The hexagonal rim 108 of each nozzle cap 88 is also rotated by means of a suitable wrench so as to move the conical water-deflecting or baffle surface 106 upward or downward in order to obtain the desired fan-shaped dispersion or deflection of the water impinging against the conical surface 106 from the outlet 98 of the auxiliary water jet passageway 100. These adjustments are, of course, made roughly before the sprinkler is operated and final adjustment is made in accordance with the spray and sprinkling produced by these preliminary rough adjustments.

In the operation of the rotary lawn sprinkler 10 of the present invention, when adjusted as above described, let is be assumed that the sprinkler 10 is at rest, with the water shut off as shown in FIGURE 1. Water under pressure passes from the hose 66 through the coupling nipple 60 and port 58, passageways 56 and inlet ducts 54 above the lower end portion 74 of the sprinkler head shaft 70, proceeds downwardly parallel to the axis of the shaft bore 71 and impinges upon the disc-shaped hub 116 of the retardation rotor 18 in a direction substantially perpendicular thereto. This action tends to force the retardation rotor 18 downwardly, relieving the frictional braking effect of the washer 110 against the lower end 53 of the shaft bearing 50. The water continues through the spaces between the counter-rotation vanes or blades 120, thereby imparting a counterclockwise retardation torque to the sprinkler head shaft 70, when viewed from above (FIGURES 2 and 4).

The water under pressure then flows upward through the bores 71, 79 and 85 of the sprinkler head shaft 70, tubular arms 78 and inclined nozzle stems 84, emerging at high velocity from the nozzle cap openings 92 in jet streams of water reaching great distances. At the same time, the pressure of the water against the lower end of the sprinkler head shaft 70 and also against the piston area 73 at its upper end urges the sprinkler head shaft 70 upward into the operating position shown in FIGURE 2.

The inclination of the sprinkler nozzles 80 rearwardly relatively to the intended direction of rotation of the sprinkler head 16, as indicated by the arrow in FIGURE 2, produces a rotational torque by the reaction effect of the water stream or jet, thereby rotating the sprinkler head 16. At the same time, water emerging from the auxiliary jet passageways 100 impinges upon the conical nozzle cap surfaces 106 so as to produce fan-shaped water curtains which water the inner portions of the approximately circular area sprinkled by the lawn sprinkler 10. The retardation rotor 18 meanwhile prevents the sprinkler head 16 from increasing its speed of rotation to an excessive speed incompatible with the throwing of water to a great distance, as explained above, and thus causes the water jet streams from the sprinkler nozzles 80 to be thrown to long ranges.

What I claim is:
1. A rotary lawn sprinkler comprising a hollow supporting structure having a water chamber therein and a water supply connection communicating with said chamber, a rotary sprinkler head having a hollow shaft rotatably mounted in said supporting structure and extending into said chamber, said sprinkler head having thereon a plurality of reaction sprinkler nozzles disposed remote from said shaft, said nozzles having water discharge passageways therein inclined upwardly and rearwardly relatively to the intended direction of rotation of said sprinkler head in reaction-rotation-producing relationship thereto, said sprinkler head having a water outlet passageway extending through said shaft to said nozzle discharge passageways, and means responsive to the flow of water through said chamber and operatively connected to said shaft for imparting a retardation torque to said shaft in opposition to the reaction rotation of said sprinkler head, said retardation-imparting means including a retardation rotor having vanes thereon disposed in counter-rotating inclination relatively to the direction of rotation of said shaft and to the direction of impingement of water thereon from said water supply connection, said retardation rotor being connected directly to said hollow shaft and rotatable unitarily therewith and with said sprinkler head at substantially the same speed of rotation as said hollow shaft and sprinkler head.

2. A rotary lawn sprinkler comprising a hollow supporting structure having a water chamber therein and a water supply connection communicating with said chamber, a rotary sprinkler head having a hollow shaft rotatably mounted in said supporting structure and extending into said chamber, said sprinkler head having thereon a plurality of reaction sprinkler nozzles disposed remote from said shaft, said nozzles having water discharge passageways therein inclined upwardly and rearwardly relatively to the intended direction of rotation of said sprinkler head in reaction-rotation-producing relationship thereto, said sprinkler head having a water outlet passageway extending through said shaft to said nozzle discharge passageways, and means responsive to the flow of water through said chamber and operatively connected to said shaft for imparting a retardation torque to said shaft in opposition to the reaction rotation of said sprinkler head, said retardation-imparting means including a retardation rotor having vanes thereon disposed in counter-rotating inclination relatively to the direction of rotation of said shaft and to the direction of impingement of water thereon from said water supply connection, said water supply connection entering said chamber above said retardation rotor and directing the incoming water upon the upper side of said rotor.

3. A rotary lawn sprinkler, according to claim 2, wherein said rotor has a disc-shaped central portion and wherein the incoming water impinges upon said central portion.

4. A rotary lawn sprinkler comprising a hollow supporting structure having a water chamber therein and a water supply connection communicating with said chamber, a rotary sprinkler head having a hollow shaft rotatably mounted in said supporting structure and extending into said chamber, said sprinkler head having thereon a plurality of reaction sprinkler nozzles disposed remote from said shaft, said nozzles having water discharge passageways therein inclined upwardly and rearwardly relatively to the intended direction of rotation of said sprinkler head in reaction-rotation-producing relationship thereto, said sprinkler head having a water outlet passageway extending through said shaft to said nozzle discharge passageways, and means responsive to the flow of water through said chamber and operatively connected to said shaft for imparting a retardation torque to said shaft in opposition to the reaction rotation of said sprinkler head, said retardation-imparting means including a retardation rotor having vanes thereon disposed in counter-rotating inclination relatively to the direction of rotation of said shaft and to the direction of impingement of water thereon from said water supply connection, said housing stucture including a water inlet manifold member disposed above said chamber, said manifold member having water inlet duct means therein directed downwardly toward said retardation rotor and said water supply connection being attached to said manifold member and communicating with said duct means.

5. A rotary lawn sprinkler, according to claim 4, wherein said inlet duct means includes a pair of ducts disposed on opposite sides of said shaft.

6. A rotary lawn sprinkler comprising a supporting structure, a rotary sprinkler head having a hollow shaft rotatably mounted in said supporting structure, and a water supply connection attached to said supporting structure and communicating with said hollow shaft, said sprinkler head having thereon a plurality of sprinkler nozzles disposed remote from said shaft, said nozzles having water discharge passageways therein inclined upwardly and rearwardly relatively to the intended direction of rotation of said sprinkler head in reaction-rotation-producing relationship thereto, said sprinkler head having a water outlet passageway extending through said shaft to said nozzle discharge passageways, one of said nozzles having a water-deflecting portion on the exterior thereof said last-mentioned nozzle having an auxiliary water discharge passageway extending from the interior of said nozzle into close proximity to said water-deflecting portion in aligned relationship therewith.

7. A rotary lawn sprinkler, according to claim 6, wherein said water deflecting portion includes a surface inclined to the axis of the water discharge passageway of the nozzle.

8. A rotary lawn sprinkler, according to claim 7, wherein said inclined surface is of generally frusto-conical configuration.

References Cited in the file of this patent
UNITED STATES PATENTS

| | | |
|---|---|---|
| 1,080,136 | Campbell | Dec. 2, 1913 |
| 1,642,910 | Thompson | Sept. 20, 1927 |
| 1,721,758 | Warner | July 23, 1929 |
| 1,779,983 | Roach | Oct. 28, 1930 |
| 1,806,100 | Thompson | May 19, 1931 |
| 2,056,290 | Meng | Oct. 6, 1936 |
| 2,509,576 | Morgan | May 30, 1950 |